US012626267B2

(12) United States Patent
Singavarapu et al.

(10) Patent No.: US 12,626,267 B2
(45) Date of Patent: May 12, 2026

(54) OMNICHANNEL DATA PROCESSING AND ANALYSIS

(71) Applicant: Zoho Corporation Private Limited, Chengalpattu Taluk (IN)

(72) Inventors: Sai Prasanth Singavarapu, Nellore (IN); Rhea Thomas, Begusarai (IN); Priyanka Satish, Chennai (IN); V Vikash Kumaran, Gudalur (IN); Ram Prakash S, Thoothukudi (IN); Sanjeev Kumar Srinivasan Khannan, Erode (IN); Karthick S, Chennai (IN); Hari Bharathi A, Tuticorin (IN); Azarudeen Mohamed Ibrahim, Trichy (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 444 days.

(21) Appl. No.: 18/094,904

(22) Filed: Jan. 9, 2023

(65) Prior Publication Data
US 2023/0222527 A1 Jul. 13, 2023

Related U.S. Application Data

(60) Provisional application No. 63/322,679, filed on Mar. 23, 2022.

(30) Foreign Application Priority Data

Jan. 12, 2022 (IN) .............................. 202241001721

(51) Int. Cl.
*G06Q 30/01* (2023.01)
*G06Q 30/0202* (2023.01)
(52) U.S. Cl.
CPC ......... *G06Q 30/0202* (2013.01); *G06Q 30/01* (2013.01)

(58) Field of Classification Search
CPC ...................................................... G06Q 30/01
See application file for complete search history.

(56) References Cited

U.S. PATENT DOCUMENTS

| 11,205,103 B2 * | 12/2021 | Zhang | .................... G06N 20/10 |
| 11,392,847 B1 * | 7/2022 | Abdollahian | .......... G06N 20/00 |

(Continued)

FOREIGN PATENT DOCUMENTS

| AU | 2021105938 A4 | 12/2021 | |
| GB | 2622478 A * | 3/2024 | ............. G06F 40/35 |

OTHER PUBLICATIONS

D. Rotovei, "Multi-Agent Aspect Level Sentiment Analysis in CRM Systems," 2016 18th International Symposium on Symbolic and Numeric Algorithms for Scientific Computing (SYNASC), Timisoara, Romania, 2016, pp. 400-407 (Year: 2016).*

(Continued)

*Primary Examiner* — Jerry O'Connor
*Assistant Examiner* — Philip N Warner
(74) *Attorney, Agent, or Firm* — AHMANN KLOKE LLP

(57) ABSTRACT

Natural Language Processing (NLP) techniques are used to facilitate inferring actionable insights from interactions. Customer data from various communication channels can be used to determine, for example, voice-related aspects from sentiment analysis, intent analysis, Semantic Conscious Word Extraction (SCWE), emotion analysis, and contextual summarization. These analysis results can also be used, along with customer profile information, for deriving deep customer insights. The deep customer insight driven analysis can include multivariate customer fragmentation, setback accountability analysis, potential contender analysis, and propulsive business planning.

16 Claims, 15 Drawing Sheets

(56) References Cited

U.S. PATENT DOCUMENTS

| | | | | |
|---|---|---|---|---|
| 2015/0302423 | A1* | 10/2015 | Thirugnanasundaram ................. | |
| | | | | G06Q 30/0201 |
| | | | | 705/7.29 |
| 2016/0171537 | A1* | 6/2016 | Fanous ............... | G06F 16/9535 |
| | | | | 705/14.53 |
| 2016/0196561 | A1* | 7/2016 | Iyer ..................... | G06Q 30/016 |
| | | | | 705/304 |
| 2016/0253688 | A1* | 9/2016 | Nielsen ............. | G06Q 30/0202 |
| | | | | 705/7.31 |
| 2019/0164170 | A1* | 5/2019 | Kataria ................ | G06Q 30/016 |
| 2019/0244225 | A1* | 8/2019 | Ravichandran .... | G06Q 30/0201 |
| 2020/0134492 | A1* | 4/2020 | Copeland ........... | G10L 15/1822 |
| 2020/0293619 | A1 | 9/2020 | Ayers | |
| 2022/0109911 | A1* | 4/2022 | Quisenberry .... | H04N 21/44218 |
| 2022/0261818 | A1* | 8/2022 | Litvak-Hinenzon ......................... | |
| | | | | G06Q 30/0282 |
| 2022/0366145 | A1* | 11/2022 | Hosseini-Asl ........... | G06N 3/08 |
| 2023/0033328 | A1* | 2/2023 | Pal .......................... | G06N 7/01 |
| 2023/0112589 | A1* | 4/2023 | Kanagovi ............... | G06N 3/08 |
| | | | | 707/739 |

OTHER PUBLICATIONS

B. Al Asaad and D. Rotovei, "Business Decisions Support using Sentiment Analysis in CRM Systems," 2020 22nd International Symposium on Symbolic and Numeric Algorithms for Scientific Computing (SYNASC), Timisoara, Romania, 2020, pp. 315-318 (Year: 2020).*

* cited by examiner

Preprocessed Data

BILSTM with CRF model
402

K

Priority order for sentiment/intent/emotion customization from organization
404

Finding sentiment/intent/emotion of K and grouping K with same voice related aspects
406

Sorting K of each group in descending order based on SS(K)
408

Arranging groups of K in order of customization
410

500

Collecting data from multiple different sources
502

K

Data preprocessing
504

Tokenizing data using BART tokenizer
506

Building BART model
508

Fine tuning the model using CRM customer data
510

Generating a terse contextual summary
incorporating intentions/emotions of a customer
512

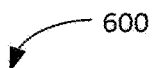
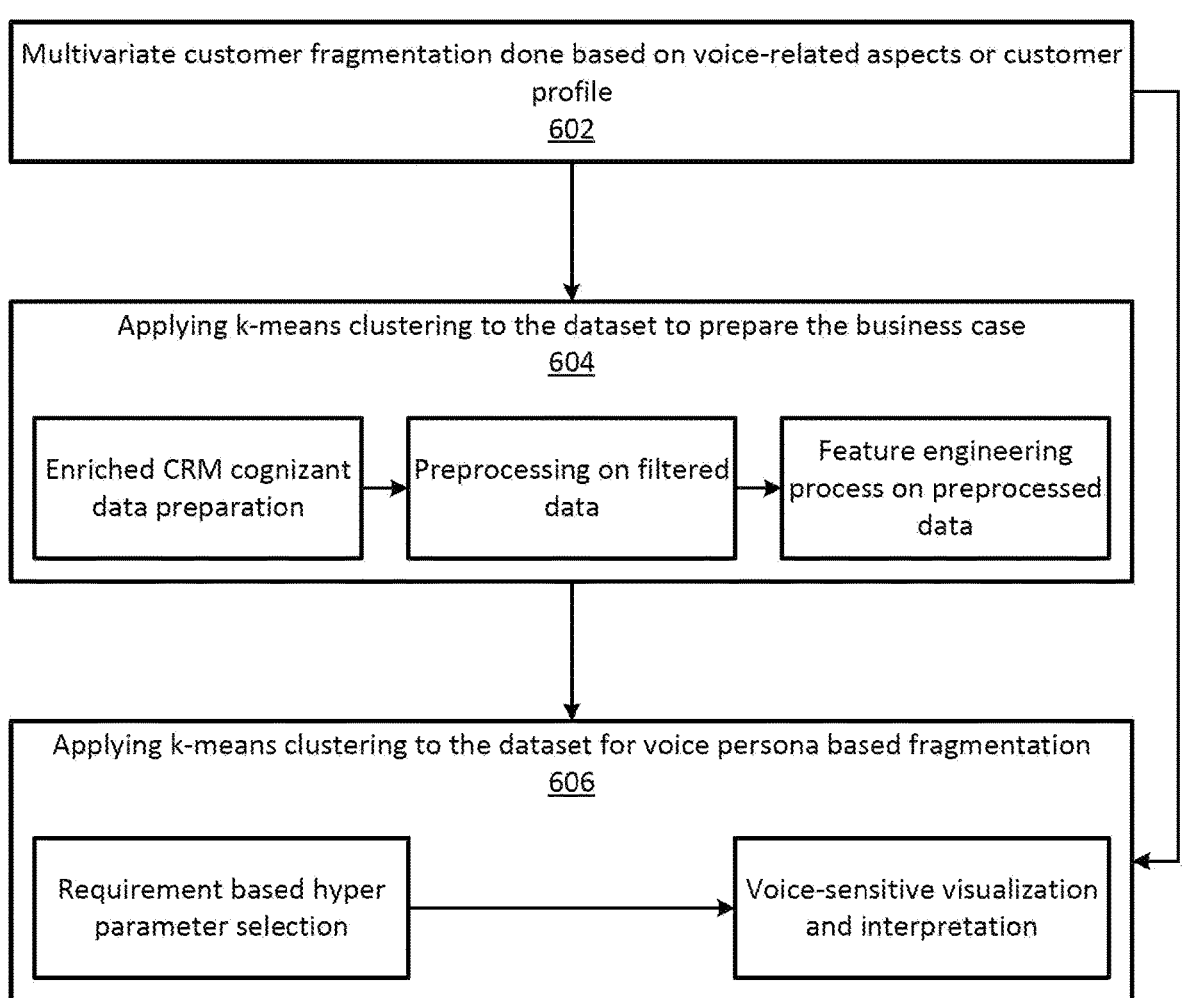
FIG. 6

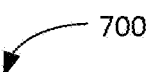
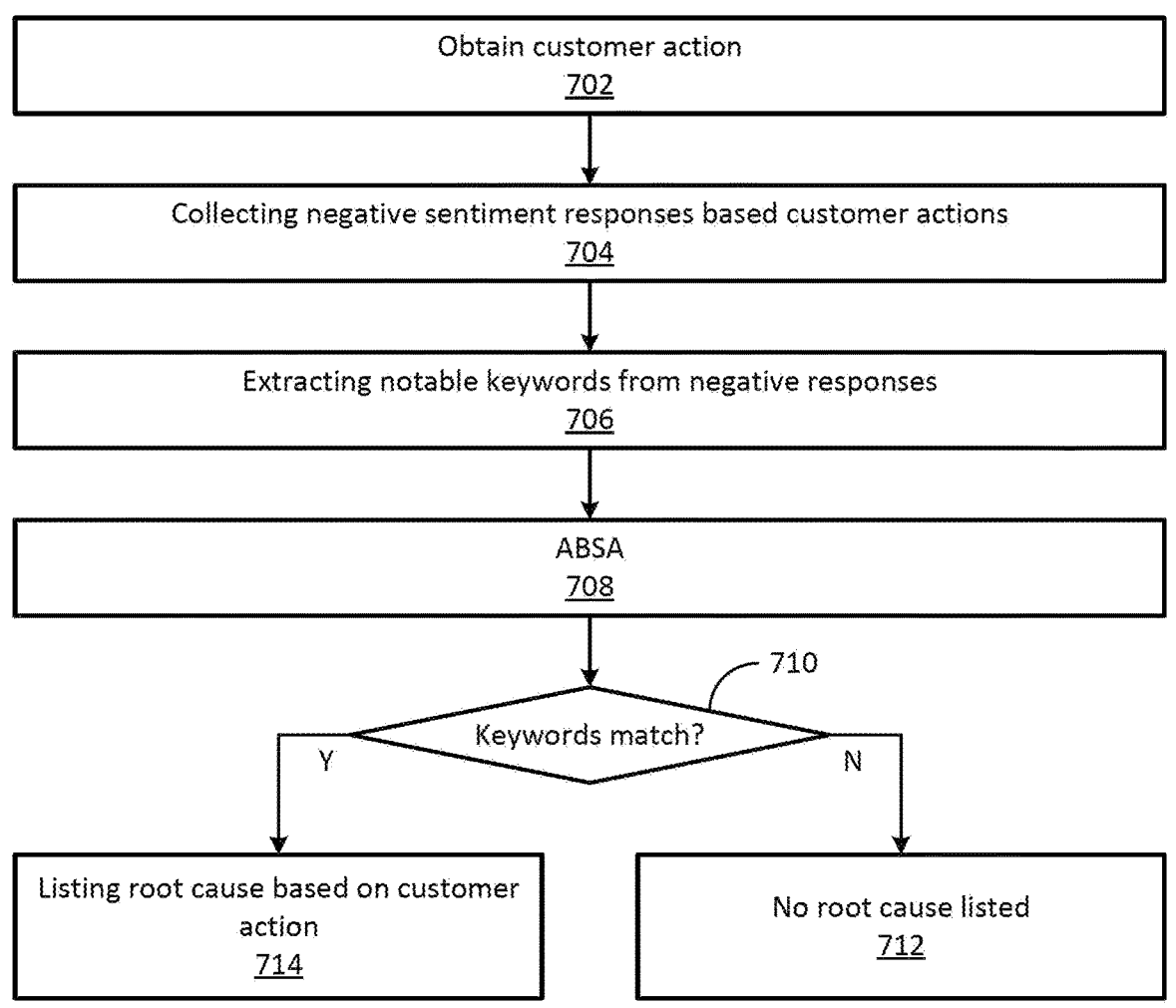
FIG. 7

800

Obtaining dataset for ABSA
802

Text preprocessing
804

Tokenizing the data into readable format by the model
806

Model training
808

Evaluating trained model
810

Predicting sentiments of various aspects in a given input
812

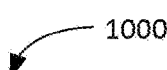
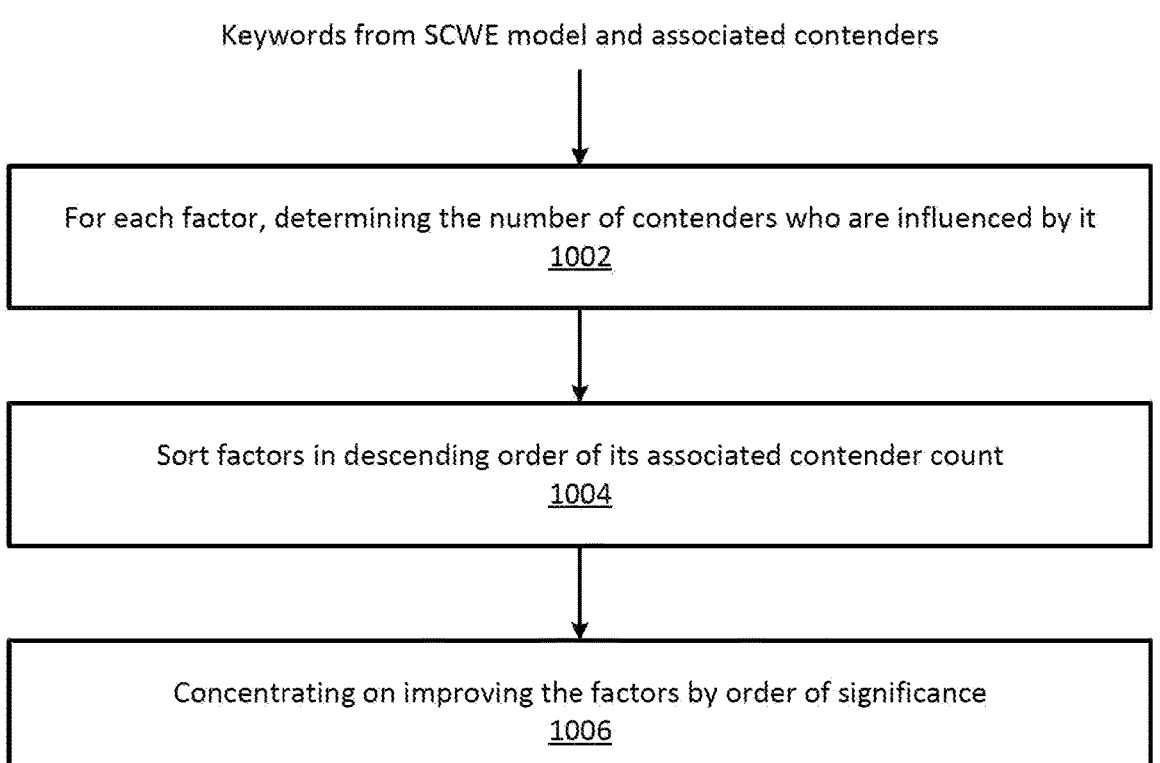
Keywords from SCWE model and associated contenders
For each factor, determining the number of contenders who are influenced by it
1002
Sort factors in descending order of its associated contender count
1004
Concentrating on improving the factors by order of significance
1006
FIG. 10

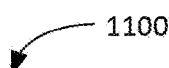
1100

Conversations about contenders with identifiable sentiment

Filtering conversations with positive sentiment
1102

Determining the number of customers with positive sentiment for each contender
1104

Sorting contenders in descending order by customer count to find challenging contenders
1106

Identifying factors of challenging contenders from positive customer conversations using SCWE
1108

Concentrating on improving the factors of challenging contenders
1110

FIG. 11

1200

Identifying CoC due to contender attraction
1202

Filtering CoC conversations in which contenders are mentioned
1204

Determining the limit on conversations with negative sentiment before churn
1206

Identifying factors behind CoC using SCWE model
1208

Identifying customers who might churn out using multivariate customer fragmentation based on CoC characteristics
1210

Concentrating on the fragmented customers by improving identified factors before reaching the conversation limit
1212

FIG. 12

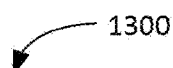

Summaries from customer conversations

Calculating and averaging SS1 for each summary with respect to each other summary
1302

Clustering similar summaries based on SS1
1304

Calculating the average SS2 for each summary with each other summary within a cluster
1306

Picking the summary with the highest SS2 in the cluster
1308

Sorting the picked summaries from each cluster in descending order of SS1
1310

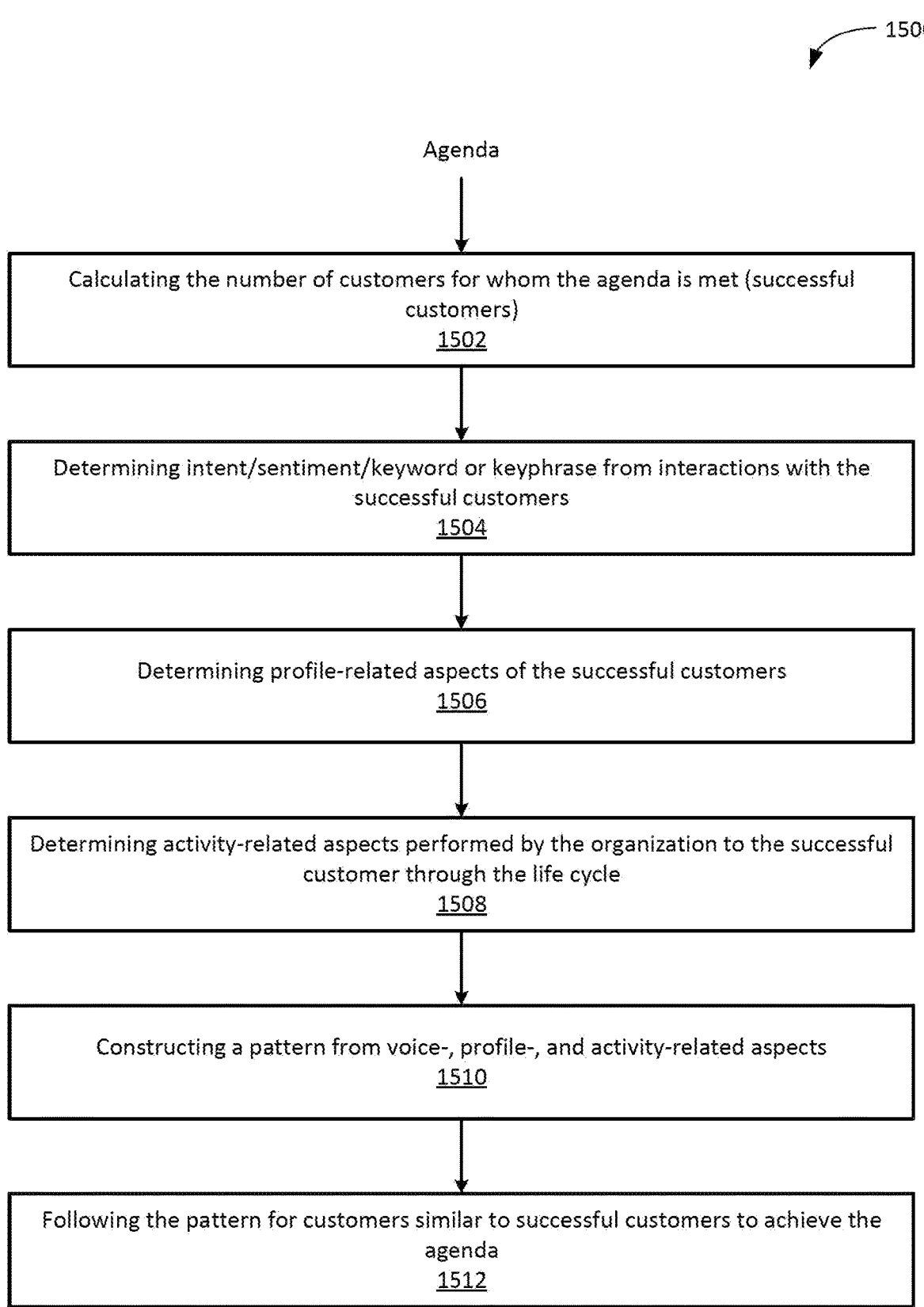

Agenda

Calculating the number of customers for whom the agenda is met (successful customers)
1502

Determining intent/sentiment/keyword or keyphrase from interactions with the successful customers
1504

Determining profile-related aspects of the successful customers
1506

Determining activity-related aspects performed by the organization to the successful customer through the life cycle
1508

Constructing a pattern from voice-, profile-, and activity-related aspects
1510

Following the pattern for customers similar to successful customers to achieve the agenda
1512

FIG. 15

OMNICHANNEL DATA PROCESSING AND ANALYSIS

CROSS-REFERENCE TO RELATED APPLICATIONS

The present application claims priority to U.S. Provisional Patent Application No. 63/322,679 filed Mar. 23, 2022, entitled "COGNITION ASSISTED OMNICHANNEL DIGESTER", and Indian Provisional Patent Application No. 202241001721 filed Jan. 12, 2022, entitled "COGNITION ASSISTED OMNICHANNEL DIGESTER", all of which are hereby incorporated by reference herein.

TECHNICAL FIELD

Embodiments of the present disclosure are related, in general, to Natural Language Processing (NLP) and more particularly, but not exclusively to analyzing unstructured data from different channels.

BACKGROUND

Data is generated at a very rapid pace. Data can include customer information in the form of text and speech. Customer interactions and their corresponding data are part of a typical CRM system. Such interactions are received through different channels like e-mail, call, survey, service desk ticket and social media.

SUMMARY

An automatic analysis on unstructured data to derive deep customer insights is provided in an Omnichannel Intelligent Pulse Digester (OIPD) framework. Actionable insights are derived from customer data obtained through multiple communication channels for calls, ticket management, surveys, and email, to name several. Voice-related aspects can be extracted from the customer data using Natural Language Processing (NLP) models such as sentiment analysis, intent analysis, Semantic Conscious Word Extraction (SCWE), emotion analysis, and contextual summarization. Deep customer analysis that includes multivariate customer fragmentation, setback accountability analysis, potential contender analysis, and propulsive business planning can be performed considering, for example, voice-related aspects.

BRIEF DESCRIPTION OF DRAWINGS

FIG. 6 depicts a flow diagram of an example of customer fragmentation analysis.

FIG. 7 depicts a flowchart of an example of setback accountability analysis.

FIG. 10 depicts a flowchart of an example of significant factor determination.

FIG. 11 depicts a flowchart of an example of significant contender determination.

FIG. 12 depicts a flowchart of an example of possible switching customer identification.

FIG. 13 depicts a flowchart of an example of providing reasoning for potential contender analysis using contextual summarization.

FIG. 15 depicts a flowchart of a method of constructing a pattern to achieve an agenda.

LIST OF TABLES

Table 1 depicts results of voice-related aspect models for a customer conversation.

Table 2 shows analysis results for customer conversations.

DETAILED DESCRIPTION

Interactions with, for example, a customer contain information in an unstructured format that can includes surveys, issues, and other business process related details. Hence, it is difficult to draw inferences from the data in a superficial manner, such as by looking at it. An Omnichannel Intelligent Pulse Digester (OIPD) framework provides an automated way of analyzing the unstructured data using Natural Language Processing (NLP) techniques to derive significant insights from it. Omnichannel, as used in this paper, is intended to represent multiple different sources of a pulse, such as communication channel (e.g., email, voice, or the like) or a data channel (e.g., a survey, desk data, transaction data, product or service data, industry data, or the like). A pulse, as used in this paper, is an activity associated with an item of interest, such as a communication instance with a customer, a transaction, data about a product or service, data about an industry, or some other data item or activity. Digestion, as used in this paper, is intended to indicate various related pulses (even if the relationship cannot be easily articulated by a human) are considered in the aggregate; and intelligent, as used in this paper, is intended to indicate the aggregation yields an insight related to the aggregated pulses from the various channels. Customer insights, for example, are useful to deliver business information in an anticipated, relevant, and timely manner. It can facilitate better pricing, promotion, and management-related decisions. Advantages include turning customer data into insights and turning insights into loyalty, profitability, and sustainable growth.

Figure 1:
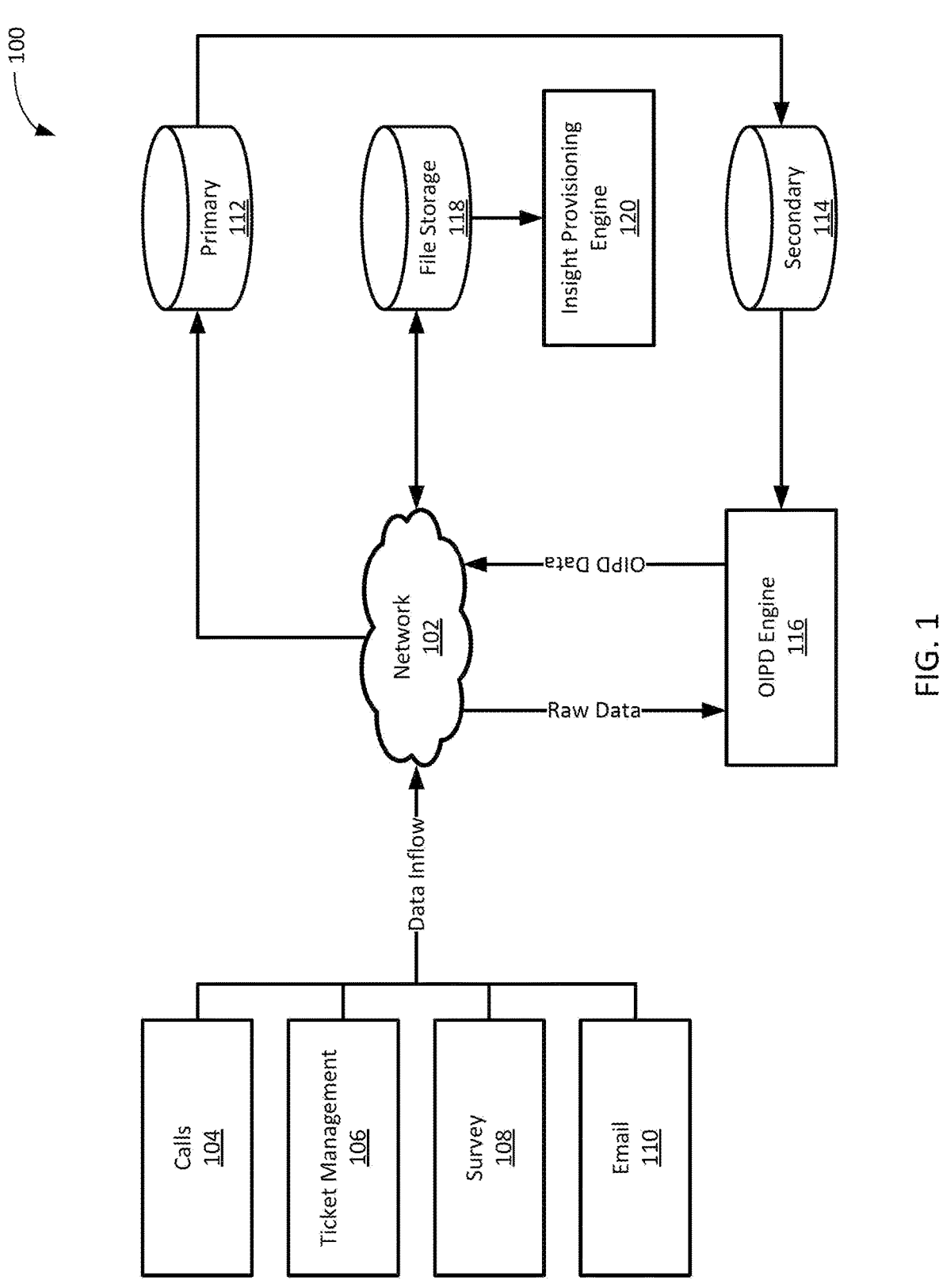
FIG. 1 depicts an Omnichannel Intelligent Pulse Digester (OIPD) system.

FIG. 1 depicts a diagram 100 of an example of an Omnichannel Intelligent Pulse Digester (OIPD) system. The diagram 100 includes a network 102, calls data 104, ticket management data 106, survey data 108, email data 110, a primary datastore 112, a secondary datastore 114, an Omnichannel Intelligent Pulse Digester (OIPD) engine 116, a file storage datastore 118, and an insight provisioning engine 120. The calls data 104, ticket management data 106, survey data 108, and email data 110 are data inflow through the network 102 to the primary datastore 112, and secondary datastore 114, and to the OIPD engine 116. The OIPD engine 116 receives raw data and outputs OIPD data, which is stored in the file storage datastore 118, which can also include other customer relationship management (CRM) data, such as customer profiles, company data, transaction data, or the like. (The "raw data" is distinguished from data the OIPD engine 116 obtains from the secondary datastore 114 in the example of FIG. 1 for the purpose of calling it out later for illustrative purposes; the data from the secondary datastore 114 can pass through the network 102 to the OIPD engine 116, though this is not shown.) The insight provisioning engine 120 uses the file storage datastore 118 to generate output for use by a human or artificial agent to facilitate the generation of insights, as described in more detail below.

The network 102 and other networks discussed in this paper are intended to include all communication paths that are statutory (e.g., in the United States, under 35 U.S.C. 101), and to specifically exclude all communication paths that are non-statutory in nature to the extent that the exclusion is necessary for a claim that includes the communication path to be valid. Known statutory communication paths include hardware (e.g., registers, random access memory (RAM), non-volatile (NV) storage, to name a few), but may or may not be limited to hardware.

The network 102 and other communication paths discussed in this paper are intended to represent a variety of potentially applicable technologies. For example, the network 102 can be used to form a network or part of a network. Where two components are co-located on a device, the network 102 can include a bus or other data conduit or plane. Where a first component is co-located on one device and a second component is located on a different device, the network 102 can include a wireless or wired back-end network or LAN. The network 102 can also encompass a relevant portion of a WAN or other network, if applicable.

The devices, systems, and communication paths described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

Referring once again to the example of FIG. 1, the OIPD system consumes data from the customers through various communication channels, as represented in the diagram 100 by the calls data 104, ticket management data 106, survey data 108, and email data 110 (referred to collectively as "data inflow"). The process related information is maintained in the primary datastore 112.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual Fox-Pro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the secondary datastore 114 is intended to represent a datastore that is in synchronization with the primary datastore 112 and obtains copies of data at regular time intervals. The OIPD engine 116 uses the data stored in the secondary database for analysis and the analyzed data is sent through the network 102 to the file storage datastore 118. The OIPD engine 116 (or a more specific engine) uses the analyzed data in the file storage datastore 118 to produce graphical charts for better visualization.

A computer system can be implemented as an engine, as part of an engine or through multiple engines. As used in this paper, an engine includes one or more processors or a portion thereof. A portion of one or more processors can include some portion of hardware less than all the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

Engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

The insight provisioning engine 120 uses the file storage datastore 118 to generate output, such as graphical charts for visualization of data, for use by a human or artificial agent to facilitate the generation of insights. Advantageously, the insight provisioning engine 120 has the benefit of obtaining sentiments, intents, keywords/key phrases, emotions, and summaries, in addition to profile data (e.g., customer profile data), as described in more detail below.

Figure 2:
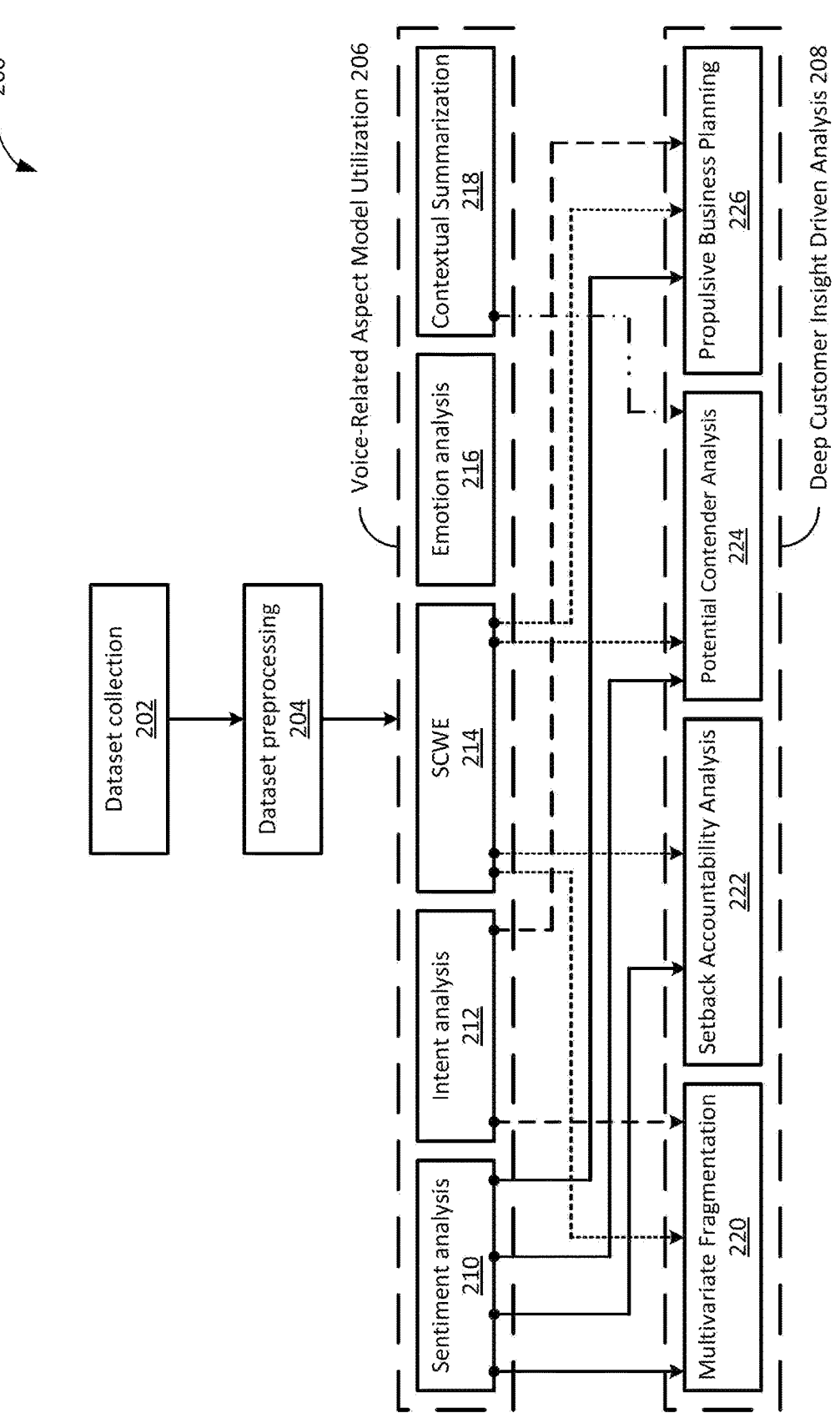
FIG. 2 depicts a flow diagram of an example of a data analysis pipeline in an OIPD system.

FIG. 2 depicts a flow diagram 200 of an example of a data analysis pipeline in an OIPD system. Natural Language Processing (NLP) techniques can be used to derive deep insights. The flow diagram 200 starts at module 202 with dataset collection. Dataset collection can include utilizing a publicly available dataset to develop models for voice-related aspects.

The flow diagram 200 continues to module 204 with data preprocessing. Data preprocessing, if necessary, converts an original dataset into a suitable format on which to perform data analysis. The preprocessing is done in such a way that the contextual meaning of the sentences in the dataset is retained. It involves, for example, one or more of removing extra white spaces, handling punctuation, and removing line jumps and web links.

The flow diagram 200 continues to module 206 with generating respective results for standalone models. For illustrative purposes, the pre-processed data is used by each of a plurality of standalone models for voice-related aspects of a pulse to generate the respective results. In the example of FIG. 2, the standalone models include a sentiment analysis model 210, an intent analysis model 212, a Semantic Conscious Word Extraction (SCWE) model 214, an emotion analysis model 216, and a contextual summarization model 218. In a specific implementation, the models include an associated engine and datastore (not shown). For example, the sentiment analysis model 210 has an associated sentiment analysis datastore and an associated sentiment analysis engine.

The sentiment analysis model 210 classifies pulses into positive, negative, and neutral sentiments. In a specific implementation, the sentiment analysis model 210 is trained with a set of sentences in a language like English, collected from customer review datasets. A sentiment analysis engine interprets those sentences and classifies them into positive, negative, and neutral sentiments. This can include, for example, tracking consecutive negative sentiments from customer conversations to aid deep customer insight driven analysis. In a specific implementation, the sentiment analysis engine uses a pre-trained DistilBERT Model (transfer learning model) that is trained by distilling Bidirectional Encoder Representations from Transformers (BERT) base. BERT is a deep learning model that can be fine-tuned with just one additional output layer to create a model that applies to a wide range of tasks like question answering and language inference. In this implementation, the sentiment analysis engine can include a DistilBertTokenizer that tokenizes CRM customer data into a readable format accepted by the pre-trained model and the pre-trained DistilBERT model with a classification head (DistilbertForSequenceClassification) can be fine-tuned using the CRM customer data to predict sentiment.

The intent analysis model 212 determines intentions toward a product or service. In a specific implementation, an intent analysis engine uses a transfer learning model that detects the intention behind customer interactions in a CRM system. The customer interactions may have different purposes specific to any product or service delivered by an organization, industry, or other source. For example, some customers may interact to share feedback about, report issues with, ask queries about, send requests regarding, or purchase a product or service. The intent analysis engine can identify a complaint, feedback, query, request, and purchase-related intentions behind the customer interactions. In a specific implementation, the intent analysis engine uses a pre-trained DistilBERT Model that is trained by distilling BERT base. In this implementation, the intent analysis engine can include a DistilBertTokenizer that tokenizes CRM customer data into a readable format accepted by the pre-trained model and the pre-trained DistilBERT model with a classification head (DistilbertForSequenceClassification) can be fine-tuned using the CRM customer data to predict intent.

The SCWE model 214 gathers significant keywords/key-phrases from a pulse. In a specific implementation, the SCWE model is trained on a public dataset to extract semantic conscious keywords/key-phrases that are specialized terms/phrases used by customers during their interactions with an organization. The collected dataset undergoes preprocessing and a random initialization of word embedding is done for the pre-processed data to convert it into vectors. In a specific implementation, following preprocessing, training of data can be accomplished using a Bi-directional Long Short Term Memory (BILSTM) with Conditional Random Fields (CRF) model. BILSTM is a neural network model that can handle sequential data (sentences with sequence of words) in both directions, backwards (future to past) or forwards (past to future). When BILSTM is integrated with CRF model, the predictions of keywords can be improved due to the consideration of contextual information.

Figure 3:
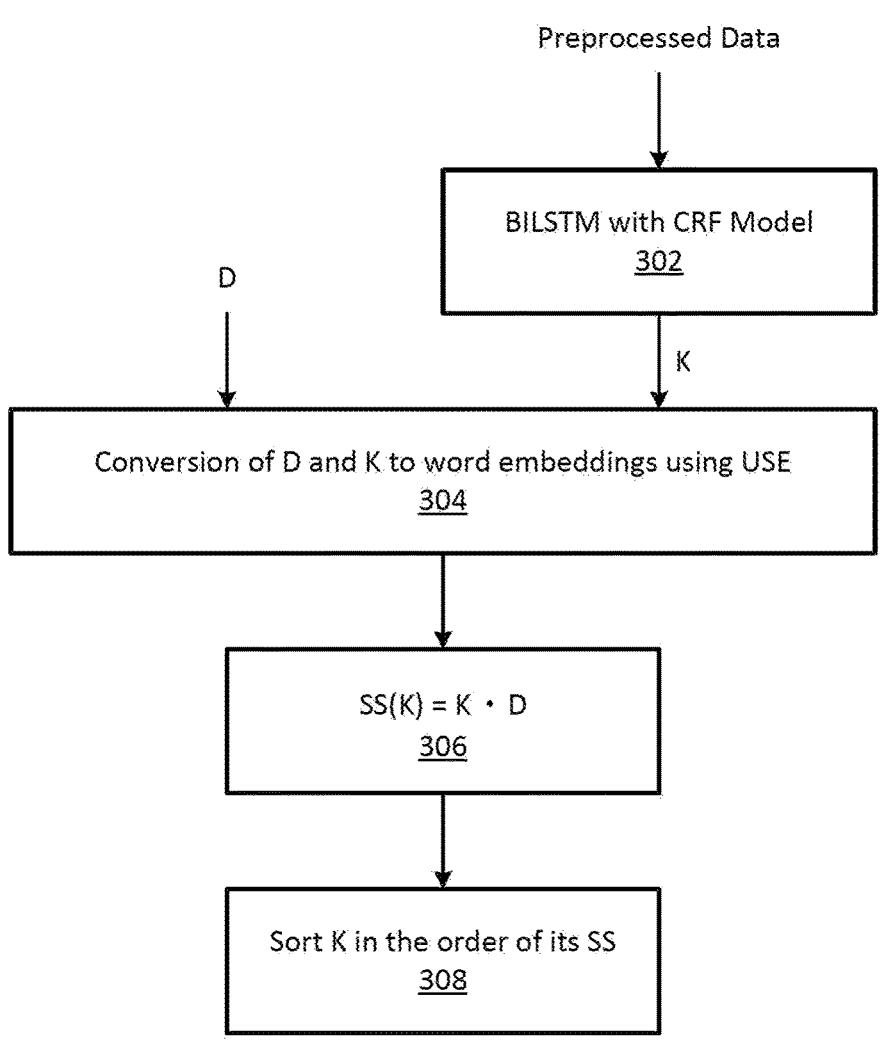
FIG. 3 depicts a flow diagram of an example of Semantic Conscious Word Extraction (SCWE) process flow for Similarity Score (SS) based sorting.

FIG. 3 depicts a flow diagram 300 of an example of SCWE process flow for Similarity Score (SS) based sorting. As is illustrated in FIG. 3, in a specific implementation, a SCWE engine uses the trained model to predict keywords/key-phrases (K) from pre-processed customer data (D). The flow diagram 300 starts at module 302, where preprocessed data is received and a BILSTM with CRF model generates K.

The flow diagram 300 continues to module 304 where D is obtained and D and K (from module 302) are converted to word embeddings using USE. In the example of FIG. 3, a Universal Sentence Encoder (USE) layer is added to the trained model to rank the generated keywords/key-phrases and to filter unnecessary keywords/key-phrases. The USE layer converts customer data and keywords/key-phrases into respective word embedding format (meaningful vector representation of data). The contribution of each word in D is distributed in the embedding of D. The amount of contribution for significant words is high in the embedding of D. The SS between K and significant words in D is high, whereas it is low for the other words in D.

The flow diagram 300 continues to module 306 where SS is determined. In this example, SS is determined as the dot product between each K and D. In a specific implementation, to remove unnecessary keywords/key-phrases, K with a similarity score (SS(K)) less than 0.1 are filtered out; K with an associated SS(K) of 0.1 or higher are retained in the keyword list. The threshold value of 0.1 may be set after conducting several rounds of experiments with CRM data.

The flow diagram 300 ends at module 308 where K is sorted in the order of its SS. For example, the keywords/key-phrases can be sorted in the descending order of their SS or using customized sorting which indicates the order of their importance. A customized sorting (as shown in FIG. 4) of the keywords/key-phrases obtained from BILSTM with CRF model can be done based on the voice-related aspects like sentiment, intent, and emotion.

Figure 4:
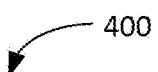
FIG. 4 depicts a flowchart of an example of customized keyword sorting.

FIG. 4 depicts a flowchart 400 of an example of customized keyword sorting. Like in FIG. 3, the flowchart 400 starts at module 402, where preprocessed data is received and a BILSTM with CRF model generates K.

The flowchart 400 continues to module 404 where sorting order with respect to the priority of sentiment/intent/emotion is provided by an organization. The priority of keywords typically varies from organization to organization, particularly for organizations in different industries. In a specific implementation, the customization includes sorting the keywords in the order of Negative, Neutral and Positive sentiments.

The flowchart 400 continues to module 406 where the sentiment/intent/emotion of K is found from the sentiment/intent/emotion of the context (e.g., customer conversation) in which the keyword occurred. K is grouped based upon the associated voice-related aspects.

The flowchart 400 continues to module 408 where, in each group, K is sorted according to SS(K). In this example, the K of each group is sorted in descending order.

The flowchart 400 ends at module 410 where the groups belonging to a particular voice-related aspects are arranged in the order of customization (in this example, a priority specified by the organization). The customized sorting is helpful for the organization to concentrate on the prioritized factors that are deemed most useful in satisfy their objectives. For example, the top "n" keywords/key-phrases may help in deriving most-reviewed comments from the customers, which facilitates improving business plans.

Referring once again to the example of FIG. 2, the emotion analysis model 216 highlights state of mind in association with a pulse. Emotion analysis provides deeper insights than sentiment analysis, which alleviates the business to make appropriate changes to its operations. In a specific implementation, an emotion analysis engine uses the emotion analysis model 216 to capture eight emotions namely Happiness, Enthusiasm, Discontentment, Frustration, Trust, Confusion, Gratitude, and Neutral. Initially, a standard dataset is annotated with emotions using zero shot classification. A synthetic data is also generated where meaningful sentences are picked and added to the dataset. The dataset that is collected may undergo the same preprocessing steps mentioned previously. In a specific implementation, the emotion analysis engine uses a pre-trained DistilBERT Model Transformer that is trained by distilling BERT base. In this implementation, the emotion analysis engine can include a DistilBertTokenizer that tokenizes customer data into a readable format accepted by the pre-trained model and the pre-trained DistilBERT model with a classification head called DistilbertForSequenceClassification can be fine-tuned.

Figure 5:
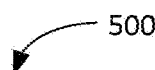
FIG. 5 depicts a flowchart of an example of contextual summarization.

The contextual summarization model 218 produces a summary comprising identified main points derived from data in a precise form. In a specific implementation, these models are for voice-related aspects of pulses associated with, for example, customer data for a set of customers (which can include a set comprising a single customer, multiple customers, or a customer persona). In a specific implementation, a contextual summarization engine works on data obtained from multiple different channels (or sources) like email conversations, research abstracts, public posts, or the like (as illustrated in FIG. 5). The contents of a dataset can have brief and precise information about the data, which the contextual summarization can use to generate a concise single-line summary. The generated single-line summary can convey the intent/emotion of the customer within it.

FIG. 5 depicts a flowchart 500 of an example of contextual summarization. The flow diagram 500 starts at module 502 with collecting data from multiple different data sources, which can include mail, research abstracts, public posts, or the like.

The flowchart 500 continues to module 504 with data preprocessing, which was described previously.

The flowchart 500 continues to module 506 with tokenizing data using a Bidirectional Auto Regressive Transformer (BART) tokenizer. The BART tokenizer converts the data into a format (encodes data as numbers) understandable by the model.

The flowchart 500 continues to module 508 with building a BART model. In a specific implementation, training on the data is done using a supervised BART model where an encoder extracts notable information from the data and a decoder uses that information to predict a summary.

The flowchart 500 continues to module 510 with fine tuning with CRM customer data. Thus, the model can be considered as a pre-trained model that undergoes fine-tuning.

The flowchart 500 ends at module 512 with generating a terse contextual summary incorporating intentions/emotions of a customer. Contextual summarization can be characterized as a permutation of sentiment, intent, and/or emotion. In a specific implementation, the terse summary is a single-line summary.

Models for voice-related aspects provide the characteristics of customers that will be helpful in knowing the perception of them towards a business. From these models, several in-depth insights are derived to scale up future products by making highly requested enhancements and providing market demanded addons.

In a specific implementation, voice-related aspects are extracted from pulses. Consider an example shown in Table 1 that explains the voice-related aspects extracted from the conversations of a retail store customer. It is to be noted that "C1", "C2", "C3", "C4" and "C5" denotes the contenders of the retail store, "Z" denotes the organization and "X", "Y" denote the countries throughout the document. As used in this paper, a contender can be an entrant, a competitor, an industry, some other party (potentially even a party that is not identifiable by name), or a group of one of these, multiple ones of these, or one or more of these.

TABLE 1

| Results of voice-related aspect models for a customer conversation | | | | | |
|---|---|---|---|---|---|
| Customer conversation | Sentiment | SCWE | Intent | Emotion | Contextual Summarization |
| I am from X trying to pay for the developer account membership for 2 months, I am not able to achieve success. My bank does not have any issue, I can buy C1 tunes from the same card. I am getting little help from the C1 support. Someone please help. It is something faced by so many users. I am facing it too. No support. Y support team sucks. If I am allowed to give a negative rating I will give −100 to the support team. | Negative | "C1 support", "Y support team", "support team", "support", "issue", "negative rating", "C1 tunes", "X", "little help", "so many users", "bank", "same card", "months", "success" | Complaint | Frustration | Trying to pay for C1 developer account for 2 months |

TABLE 1-continued

| | | | | | Contextual |
| Customer conversation | Sentiment | SCWE | Intent | Emotion | Summarization |
| --- | --- | --- | --- | --- | --- |
| I am seriously considering unsubscribing Z. I have an issue while accessing the documents, it is throwing unable to load all the time. I am very frustrated with it. I should've gone with ABC when i had the chance. | Negative | "unsubscribing Z", "very frustrated", "issue", "documents", "ABC", "chance", "time" | Complaint | Frustration | Considering unsubscribing from Z, I am very frustrated with it |

Results of voice-related aspect models for a customer conversation

Referring once again to the example of FIG. 2, the flow diagram 200 ends at module 208 with a plurality of engines utilizing the respective results of the models to perform deep customer insight driven analysis. As shown in the flow diagram 200, the engines include a multivariate customer fragmentation engine 220, a setback accountability analysis engine 222, a potential contender analysis engine 224, and a propulsive business planning engine 226. In a specific implementation, the engines each have an associated datastore (not shown). For example, the multivariate customer fragmentation engine 220 has an associated multivariate customer fragmentation datastore.

In a specific implementation, the multivariate customer fragmentation engine 220 classifies customers based on the requirements of the organization. The fragmentation can be done in more than one way, for example, based on decision factors explicitly provided by an organization or based on decision factors automatically identified from organization requirements. The organization can leverage this analysis to determine the best business plans applicable to a specific customer group. The process during analysis involves categorization of the customers based on similar characteristics and behavior where a set of similar customers are put into a bucket called a fragment. The fragmentation is done considering multiple variables or factors that include voice-related aspects like sentiment, intent, and keyword/keyphrase, along with competitor details and customer profile information (as shown in FIG. 6).

FIG. 6 depicts a flow diagram 600 of an example of customer fragmentation analysis. The flow diagram 600 starts at module 602 with multivariate customer fragmentation. Multivariate customer fragmentation can be done based on voice related aspects or customer profile. Voice related aspects can include, for example, sentiment, intent, extant keyword/keyphrase, and competitor mentions. A customer profile can include, for example, industry specification, market details (market position and product price), demographics (e.g., age, gender, and race), psychographics, geographical details, behavioral analysis (e.g., purchase frequency, recent purchases, and monetary value of the purchases), and firmographic details (e.g., employee bandwidth, industry, and total company revenue).

The flow diagram 600 continues to module 604 with applying k means clustering to the dataset to prepare the business case. The multivariate customer fragmentation prepares the business case using enriched CRM cognizant data preparation where the relevant data is filtered from the CRM data repository based on the organization requirements. CRM preparation may do basic filter for product name, features of product, etc. based on what the customer said. The pre-processed data undergoes the feature engineering process where scaling is done for skewed data to transform it to logarithmic values.

The flow diagram 600 ends at module 606 with applying k-means clustering to the dataset to group customers having similar characteristics in a fragment for voice persona-based fragmentation. The fragmentation involves requirement based hyper parameter selection and voice sensitive visualization and interpretation. The requirement based hyper parameter selection determines the optimal number of clusters as per the required scenario of the organization using the elbow method with inertia. The voice sensitive visualization and interpretation can display multiple customer fragments based on the voice-related aspects.

Referring once again to the example of FIG. 2, in a specific implementation, the setback accountability analysis engine 222 facilitates identification of plausible reasons for customer setbacks and influential factors for the setbacks. This analysis is meant to discover critical reasons for problems like deal loss, churn, and business retention about a product/service. This analysis also addresses the problem of consecutive negative sentiments about a product/service which is determined using sentiment analysis. The root cause for the setbacks can be found by backtracking the previous customer conversations with negative sentiments as they likely influence the setbacks.

FIG. 7 depicts a flowchart 700 of an example of setback accountability analysis. The flowchart 700 starts at module 702 with obtaining customer actions. Such actions can include being churned out, deal loss, consecutive deal loss, or the like.

The flowchart 700 continues to module 704 with collecting negative sentiment responses-based customer actions. This involves sentiment analysis, as described previously.

The flowchart 700 continues to module 706 where, from the negative responses, important keywords/key-phrases are extracted using SCWE, as described previously.

The flowchart 700 continues to module 708 with performing Aspect-Based Sentiment Analysis (ABSA) to identify customer sentiments associated with specific aspects of products or services. Inputs for ABSA can include calls, customer support tickets, surveys, email, or data from other channels.

Figure 8:
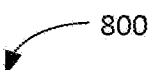
FIG. 8 depicts a flowchart of an example of Aspect-Based Sentiment Analysis (ABSA).

FIG. 8 depicts a flowchart of an example of ABSA. The flowchart 800 starts at module 802 with obtaining a dataset for ABSA. The flowchart 800 continues to module 804 with text preprocessing, to module 806 with tokenizing the data into readable format by the model (e.g., BertTokenizer), to module 808 with model training (e.g., Fine tuning Bert and adding an extra layer of LSTM), and to module 810 with evaluating the trained model. The flowchart 800 ends at module 812 with predicting sentiments of various aspects in a given input.

Referring once again to the example of FIG. 7, the flowchart 700 continues to decision point 710 where it is determined whether extracted keywords match keywords obtained from ABSA. The extracted target keywords/key-phrases from SCWE model are matched with the keywords obtained from ABSA model.

If it is determined extracted keywords do not match keywords obtained from ABSA (710—N), the flowchart 700 ends at module 712 with no root cause listed.

If, on the other hand, it is determined extracted keywords match keywords obtained from ABSA (710—Y), then the flowchart 700 ends at module 714 with listing root cause based on customer action. To find the root causes, the matched keywords are compared with predefined reasons listed under a particular customer action like churn out, deal loss, or consecutive deal loss. In a specific implementation, the predefined reasons like "Lack of innovation", "Delay in response" or others are gathered deliberately from the domain experts.

In a specific implementation, matched keywords and predefined reasons are transformed into vectors using the word embedding process. A similarity score can be calculated using the dot product between those transformed vectors, as described previously. This score determines a reason for the setback of the customers. The frequency of matched keywords can help in prioritizing predefined reasons to be concentrated for reducing the setbacks efficiently.

Referring once again to the example of FIG. 2, in a specific implementation, the potential contender analysis engine 224 identifies comments about contenders from customer data that are deemed valuable.

Figure 9:
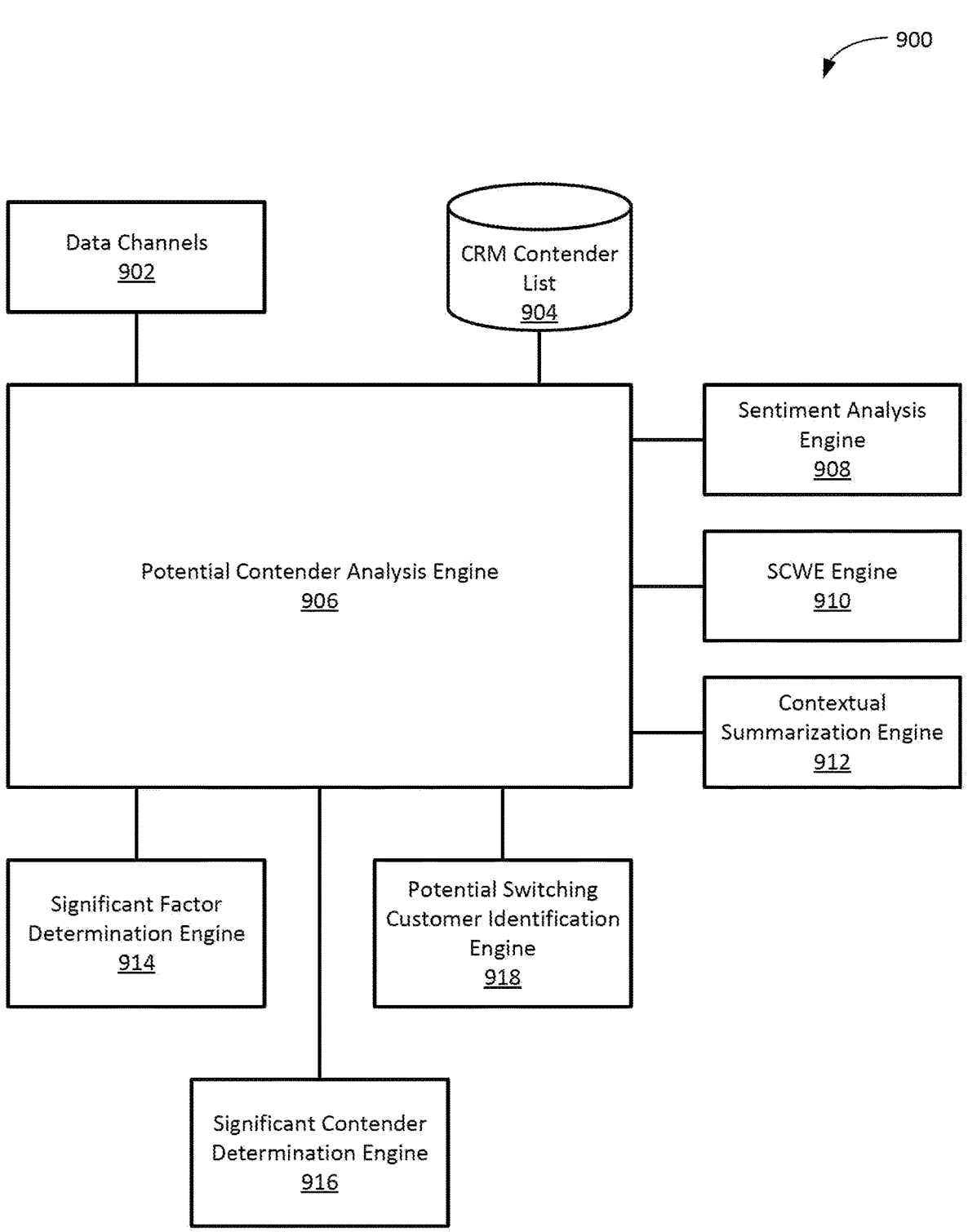
FIG. 9 depicts a diagram of an example of a potential contender analysis system.

FIG. 9 depicts a diagram 900 of an example of a potential contender analysis system. The diagram 900 includes data channels 902, a CRM contender list 904, a potential contender analysis engine 906 coupled to the data channels 902 and the CRM contender list 904, a sentiment analysis engine 908 coupled to the potential contender analysis engine 906, an SCWE engine 910 coupled to the potential contender analysis engine 906, a contextual summarization engine 912 coupled to the potential contender analysis engine 906, a significant factor determination engine 914 coupled to the potential contender analysis engine 906, a significant contender determination engine 916 coupled to the potential contender analysis engine 906, and a potential switching customer identification engine 918 coupled to the potential contender analysis engine 906.

The data channels 902 is intended to represent multiple data channels like mail, survey, and desk. The CRM contender list 904 is intended to represent a datastore of contenders (e.g., C1, C2, C3, . . . ). The potential contender analysis engine 906 communicates with the sentiment analysis engine 908 (which utilizes sentiment analysis as described previously), the SCWE engine 910 (which utilizes SCWE as described previously), and the contextual summarization engine 912 (which uses contextual summarization as described previously). The potential contender analysis engine 906 utilizes the pros and cons of competitors to improve business plans by concentrating on significant factors, challenging competitors, and possible switching customers. The potential contender analysis engine 906 provides analysis for the significant factor determination engine 914, the significant contender determination engine 916, and the potential switching customer identification engine 918.

FIG. 10 depicts a flowchart 1000 of an example of significant factor determination. The flowchart 1000 is intended to represent functionality of the significant factor determination engine 914. The flowchart 1000 starts at module 1002 with, for each factor, determining the number of contenders who are influenced by it. The module 1002 receives keywords (factors) from SCWE model and associated contenders. With many factors to be considered, the significance of a factor can be determined based on the number of competitors who are influenced by it.

The flowchart 1000 continues to module 1004 with sorting the factors in descending order (significance of the factor) of its associated contender count. An organization can concentrate on improving those factors in the order of significance. The flowchart 1000 ends at module 1006 with concentrating on improving the factors in the order of significance.

FIG. 11 depicts a flowchart 1100 of an example of significant contender determination. The flowchart 1100 is intended to represent functionality of the significant contender determination engine 916. The flowchart 1100 starts at module 1102 with filtering conversations with positive sentiments. The module 1102 receives as input conversations about contenders that have identifiable sentiments.

The flowchart 1100 continues to module 1104 with determining the number of customers that have positive sentiment for each contender. With many competitors in place, the most challenging contenders need to be determined based on the number of customers who have mentioned them positively.

The flowchart 1100 continues to module 1106 with sorting contenders in descending order of the customer count to find challenging contenders. The flowchart 1100 continues to module 1108 with identifying the factors of challenging entrants from positive customer sentiment using SCWE. An organization can consider the factors that the challenging contenders have concentrated.

The flowchart 1100 ends at module 1110 with concentrating on improving the factors of the challenging contenders.

FIG. 12 depicts a flowchart 1200 of an example of possible switching customer identification. The flowchart 1200 is intended to represent functionality of the potential switching customer identification engine 918. The flowchart 1200 starts at module 1202 with identifying Churned out Customers (CoC) due to contender attraction.

The flowchart 1200 continues to module 1204 with filtering CoC conversations in which competitors are mentioned, to module 1206 with determining a limit on conversations with negative sentiment before churn ("the conversation limit"), to module 1208 with identifying the factors behind CoC using SCWE model, and to module 1210 with identifying customers who might churn out using multivariate customer fragmentation based on CoC characteristics. From sentiment and associated keywords/key-phrases, the analysis predicts the customers who might switch to other contenders. Potential contender analysis delivers the valuable keywords/key-phrases spoken before the switch, inferring what could be the possible reason for the switch or the area that needs to be looked at with greater priority.

The flowchart 1200 ends at module 1212 with concentrating on fragmented customers by improving identifies factors before reaching the conversation limit.

In potential contender analysis, the reasons/context why a customer has switched to a contender can be obtained with the help of contextual summarization (shown in FIG. 13). The summarization model considers the negative customer conversations where the contenders are mentioned and generates a terse summary per conversation.

FIG. 13 depicts a flowchart 1300 of an example of providing reasoning for potential contender analysis using contextual summarization. The flowchart 1300 starts at module 1302 with calculating and averaging a first SS ("SS1") for each summary with respect to each other summary.

The flowchart 1300 continues to module 1304 with clustering similar summaries based on SS1, to module 1306 with calculating the average SS for each summary within the cluster ("SS2"), and to module 1308 with picking the summary with the highest SS2 within the cluster. The summaries are grouped as clusters using similarity-based clustering. For each cluster, the same process of calculating the SS (SS2) for each summary within the cluster is performed.

The flowchart 1300 ends at module 1310 with sorting the picked summaries from each cluster in descending order by SS1. The top n summaries provide the reasons/context behind the significant factors about a contender.

Referring once again to the example of FIG. 2, the propulsive business planning engine 226 is intended to represent an engine that strategically gives a layout of plans to reach an agenda. Organizations typically have agendas like reduction in deal loss, increase in positive trend, increase in customer return, increase in sales representative efficiency, increase in overall positive sentiment, and other goals to increase monetization or market value. Propulsive business planning is performed for the agenda provided by an organization.

Figure 14:
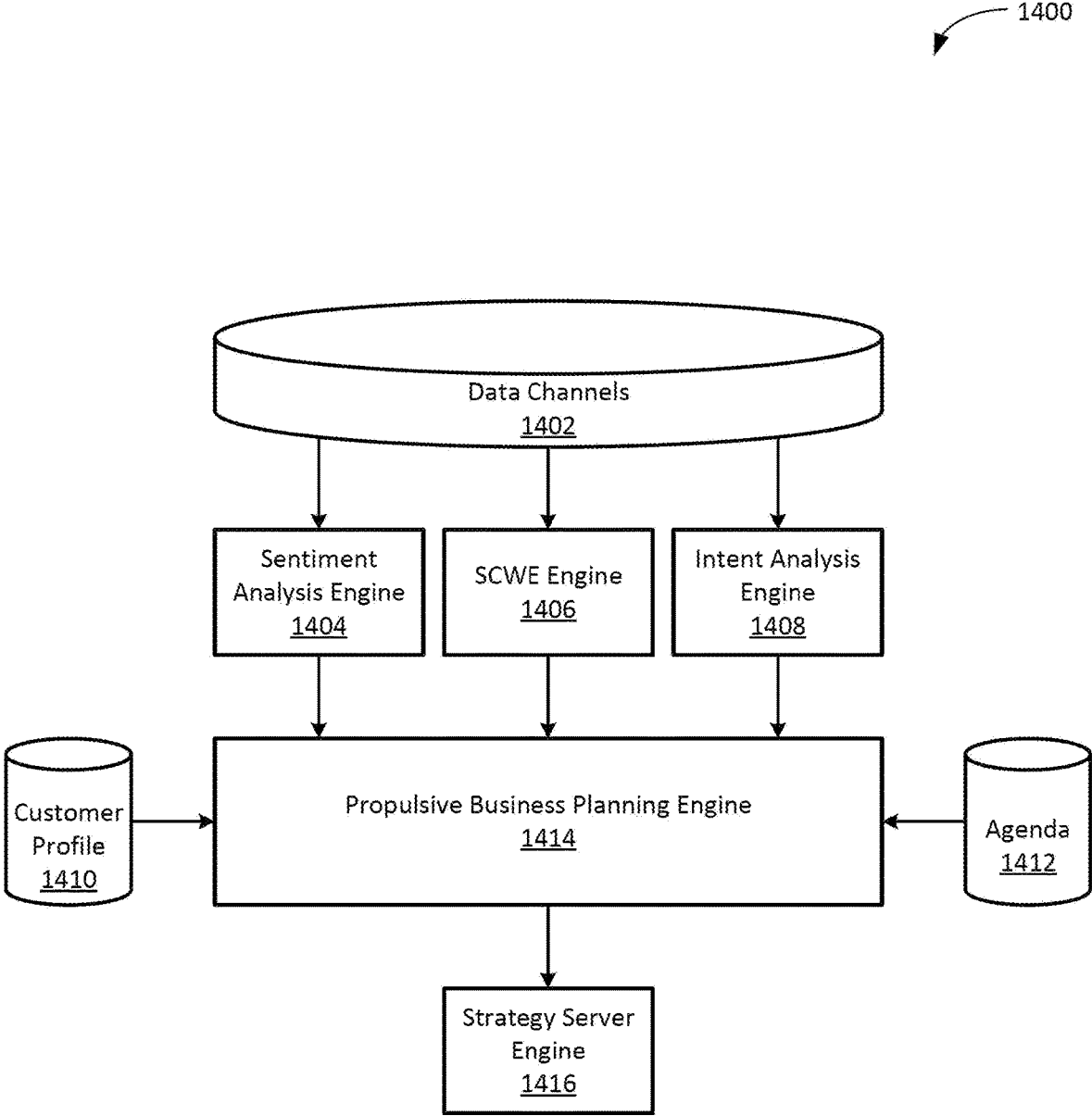
FIG. 14 depicts a diagram of an example of a propulsive business planning system.

FIG. 14 depicts a diagram 1400 of an example of a propulsive business planning system. The diagram 1400 includes data channels 1402, a sentiment analysis engine 1404 coupled to the data channels 1402, a SCWE engine 1406 coupled to the data channels 1402, an intent analysis engine 1408 coupled to the data channels 1402, a customer profile datastore 1410, an agenda datastore 1412, and a propulsive business planning engine 1414 coupled to the sentiment analysis engine 1404, the SCWE engine 1406, the intent analysis engine 1408, the customer profile datastore 1410, and the agenda datastore 1412. The diagram 1400 also includes a strategy server engine 1416 coupled to the propulsive business planning engine 1414.

The data channels 1402 can include data from mail, desk, survey, or the like, as described previously. The sentiment analysis engine 1404, the SCWE engine 1406, and the intent analysis engine 1408 are as described previously. The customer profile datastore 1410 provides data associated with a customer. The agenda datastore 1412 includes an agenda identified by a human or artificial agent of an organization.

In a specific implementation, the propulsive business planning engine 1414 filters customer conversations with their profile (in the customer profile datastore 1410) based on an agenda (in the agenda datastore 1412). To achieve the agenda, the propulsive business planning engine 1414 constructs a pattern that enables the strategy server engine 1416 to provide one of the following strategies (for example):

the number of times keywords/key-phrases with intent identified by the model must (optimally) be mentioned in the conversation with the customer (reply to customer);

the scenario in which the keywords/key-phrases must (optimally) be mentioned;

the increase/decrease of the sentiment/keywords or key-phrases/intent based on feedback provided by customers.

FIG. 15 depicts a flowchart 1500 of an example of a method of constructing a pattern to achieve an agenda. In a specific implementation, the method is carried out by the propulsive business planning engine 1414. The flowchart 1500 starts at module 1502 with calculating the number of customers for whom an agenda is met ("successful customers"). The flowchart 1500 continues to module 1504 with determining intent/sentiment/keyword or keyphrase from interactions with the successful customers, to module 1506 with determining profile-related aspects of the successful customers, to module 1508 with determining activity-related aspects performed by the organization to the successful customers throughout a lifecycle, and to module 1510 with constructing a pattern from voice-, profile-, and activity-related aspects. A lifecycle can be selected in a manner that may depend upon context (e.g., from the start to an end of a transaction, currently active customers, or the like). The profile-related aspects of the successful customers are taken into consideration to find similar customers. The activity-related aspects include any action performed by the organization to the customer throughout the customer lifecycle. It provides the right scenario as a part of the pattern. The action can be email, calls, or other interactions, or specific tasks. Henceforth, following the same pattern by mentioning the right keyword/sentiment/intent to customers in an identified scenario increases the chance of achieving the agenda.

The flowchart 1500 ends at module 1512 with following the pattern for customers like successful customers to achieve the agenda.

A use case for deep customer insight driven analysis will now be discussed. Consider a retail brand in the clothing industry and the sample customer conversations along with their respective analysis results shown in Table 2. The analysis used in deriving customer insights including sentiment, SCWE, intent, ABSA, contender identification, and contextual summarization.

TABLE 2

| Analysis results for customer conversations | | | | | | |
| --- | --- | --- | --- | --- | --- | --- |
| Customer conversation | Sentiment | SCWE | Intent | ABSA | Contender | Contextual Summarization |
| I am from X trying to pay for the new product launched for 2 months, I am not able to achieve success. My bank does not have any issue, I can buy other products from the same card. Someone please help. It is something faced by so many users. I am facing it too. No support. Y support team sucks. If I am allowed to give a negative rating I will give −100 to the support team. If this issue persists, will move to other brands C1 or C2. | Negative | Y support team, support team, support, negative rating, X, issue, bank, success, so many users, other products, new product, same card, months | Complaint | support-Negative, product-Negative | C1, C2 | Unable to pay for the new product for 2 months |
| I am really disappointed with your cloth quality. The new branch in Delhi that has | Negative | customer service, new branch, cloth | Complaint | service-Negative, | C3 | I am really disappointed |

TABLE 2-continued

Analysis results for customer conversations

| Customer conversation | Sentiment | SCWE | Intent | ABSA | Contender | Contextual Summarization |
|---|---|---|---|---|---|---|
| been opened recently is completely out of date fashion. The customer service is also been degrading with each passing day. Kindly get your act together. The other brands like C3 are standing out in the market. | | quality | | quality-Negative | | with your clothing quality. |
| Hello, Hope you had a good weekend, and your week is off to a good start. I'd like to address the issue I faced at your business facility. I understand there was a mismatch with the billing. I think there is some error made from your side. I'm hoping that you'll check again and resolve this at the earliest. | Negative | business facility, error, good weekend, issue, billing, good start, mismatch, week | Complaint | service-Negative, payment-Negative | — | Billing issue at your business facility |
| I have been trying to install your new app to check the past purchase history. But for some reason its showing no data of the billing or my purchase. Every time I am logging in its showing not showing anything. I made a payment through my credit card but the purchase wasn't made. I called your support about 3 times already regarding the same. C4 or C5 has never has issue. But no response still from your side. Someone please get back to me on this. | Negative | billing, payment, new app, credit card, purchase, support | Purchase | payment-Negative, support-Negative | C4, C5 | Your new app doesn't seem to be working. |
| My issue was caused by payment gateway during purchase. I've seen this happen on 3 different cards now. This gets triggered when I make a lot of orders in a short span of time with a particular card. On purchase it shows a server error message on the next order and that's the point when the card stops being accepted. They cannot be used after this. I'm still able to add new payment methods and pay for things with it. I just cannot use the cards after the server error. If I try to edit the added cards by re-entering the CVV, it just says the payment method cannot be used because it's pending, banned or deleted. C2 uses a good payment gateway. I guess I will have to switch to it. | Negative | payment gateway, payment method, new payment methods, server error message, server error, added cards, different cards, CVV, particular card, card, issue, next order, purchase | Purchase | payment-Negative, support-Negative | C2 | Cards stopped working after payment gateway server error on purchase |

Use-Case 1: Considering the requirement of the organization "to determine how to reactivate the lapsed customers", the OIPD framework performs multivariate customer fragmentation. Since there are a lot of keywords/key-phrases and competitors occurring per conversation (as shown in Table 2), the most commonly occurring keywords/key-phrases are taken into account for fragmentation.

The fragments can be created based on any of the voice-related aspects.

(i) Fragments Created Based on the Intent "Complaint"

Fragment 1: Leads from X country and clothing industry and lead source as trade show or festive sale, keyword as product, sentiment as Negative, Intent as Complaint and Competitors as C1, C2.

Fragment 2: Leads from X country and clothing industry and lead source as trade show or festive sale, keyword as payment, sentiment as Negative, Intent as Complaint and Competitors as C1, C2.

Fragment 3: Leads from X country and clothing industry and lead source as trade show or festive sale, keyword as service, sentiment as Negative, Intent as Complaint and Competitors as C1, C2.

(ii) Fragments Created Based on the Intent "Purchase"

Fragment 1: Leads from X country and clothing industry and lead source as trade show or advertisements, keyword as payment, sentiment as Negative, Intent as Purchase and Competitors as C2.

Fragment 2: Leads from X country and clothing industry and lead source as trade show or advertisements, keyword as server error, sentiment as Negative, Intent as Purchase and Competitors as C4, C5.

Fragment 3: Leads from X country and clothing industry and lead source as trade show or advertisements, keyword as quality, sentiment as Negative, Intent as Complaint and Competitors as C3.

The above customer fragments (i and ii) can help the retail brand in analyzing each fragment of customers and tailor to their needs accordingly and help the organization to revive the lapsed customers.

Use-Case 2: Considering the organization requirement "to find why there are a lot of churned out customers", the OIPD framework performs setback accountability analysis. In this analysis, the sample conversations with negative sentiments are used, as given in Table 2.

Among the keywords/key-phrases identified by SCWE, the repetitive keywords/key-phrases are considered which are: support team, support, issue, payment, service, billing, customer service, quality.

These keywords/key-phrases are matched with the output of ABSA which are: payment—Negative, support—Negative, service—Negative, quality—Negative, product—Negative The keywords/key-phrases that matched are:

payment support service quality

A similarity score is calculated between the matched keywords and the predefined reasons listed under "Root cause for churned out customers". The predefined reasons having the highest similarity are:

Lack of proper customer support

Poor payment infrastructure

Use-Case 3: Considering the requirement of the organization "to identify the factors to be improved when compared with its contenders", the OIPD framework performs potential contender analysis. This analysis considers the conversations in Table 2 as consecutive negative mails written by a customer to a retail brand about the increase in price, clothing quality, issues regarding the payment and also compares the services and payment process with its competitors.

From the above consecutive negative mails, it is seen that customers are mostly complaining about the factors such as payment, customer service, clothing quality, billing, support team which are identified using SCWE model. The analysis identifies the competitors such as C1, C2, C3, C4 and C5 from the conversations. From the mentioning of the competitors in the negative conversations, it is vivid that the customer may switch to its competitors if the issues still persist.

For identifying the reason (issues) behind the significant factors, the summaries of each conversation considered are found using contextual summarization (as shown in Table 2). The similarity among the summaries is calculated and sorted in descending order which is:

S1: Unable to pay for the new product for 2 months

S2: Billing issue at your business facility

S3: Cards stopped working after payment gateway server error on purchase

S4: Your new app doesn't seem to be working.

S5: I am really disappointed with your clothing quality.

The sorted summaries are clustered using similarity-based clustering where S1, S2 and S3 belong to cluster-1, S4 belong to cluster-2 and S5 belongs to cluster-3. The SS for the summaries in each cluster is calculated and the important summary having the highest SS in each cluster is found as:

Cards stopped working after payment gateway server error on purchase

Your new app doesn't seem to be working.

I am really disappointed with your cloth quality.

These summaries state the context behind the significant factors to be concentrated by the organization to achieve the agenda. The significant factors and challenging contenders can be determined from the number of contenders per factor, number of customers per contender with its sentiment respectively. Here, the significant factors are "payment" and "billing" and the challenging contender is C2. From the analysis results that includes the context, the organization can focus on reducing the price, solving the payment issue and improving the clothing quality.

Use-Case 4: Considering the requirement of the organization (agenda) "to increase revenue by winning more number of deals", the OIPD framework performs propulsive business planning. This analysis uses the sample customer conversations in Table 2 along with the respective keywords/key-phrases, intents and sentiments.

The contributing factor can be obtained from the responses given by the salesperson to the customer conversations in Table 2. The contributing factors extracted are "offer" and "discount". Thus the pattern found from the analysis is "Giving an offer on the second purchase has resulted in a higher percentage of customers having closed won deals". From this pattern, the strategy of "Mentioning the offer more positively on the second purchase" is derived. The "second purchase" is the exact scenario identified from the pattern. This strategy is used by the sales person in their response mails to the customers to increase the winning deals.

What is claimed is:

1. A method comprising:

collecting a dataset, wherein the dataset includes a first pulse from a first channel and a second pulse from a second channel;

performing preprocessing on the dataset, wherein word embedding is done for the preprocessed data to convert it into vectors;

generating respective results for a plurality of different analysis models, wherein the plurality of different analysis models includes:

pre-training a sentiment analysis model, fine-tuned using Customer Relationship Management (CRM) data to predict sentiment, that classifies the first pulse and the second pulse into respective ones of positive, negative, or neutral sentiment, wherein the sentiment analysis model comprises a deep transfer learning model, and wherein the fine-tuning includes tokenizing the CRM data into a readable format accepted by the pre-trained sentiment analysis model;

an intent analysis model, fine-tuned using CRM data to predict intent, that classifies the first pulse and the second pulse into respective ones of complaint, feedback, query, request, or purchase-related intention;

a Semantic Conscious Word Extraction (SCWE) model trained to extract semantic conscious keywords/key-phrases from pulses, wherein, in operation, the pulses include the first pulse and the second pulse;

utilizing the respective results of the plurality of different analysis models to perform deep customer insight driven analysis, wherein the deep customer insight driven analysis includes:

propulsive business planning to achieve an agenda;

filtering, based on the agenda, customers who have met the agenda;

considering the conversations made by a particular type of entity to the filtered customers, wherein the customer conversations include a first conversation and a second conversation, and wherein the first pulse is associated with the first conversation, and the second pulse is associated with the second conversation;

determining aspects/information about the filtered customers including activity-related aspects, wherein the activity-related aspects identify a number of times that keywords or key-phrases with the intent are mentioned in the conversations with the filtered customers;

increasing or decreasing, based on feedback provided by the customers, any of the sentiment, the keywords, or the key-phrases with the intent;

constructing a pattern from the determined aspects/information to achieve the agenda.

2. The method of claim 1, wherein the plurality of different analysis models includes the sentiment analysis model and the intent analysis model, and wherein the sentiment analysis model is trained by distilling Bidirectional Encoder Representations from Transformers (BERT) base.

3. The method of claim 1, wherein the plurality of different analysis models includes an emotion analysis model that classifies the first pulse and the second pulse into respective ones of happiness, enthusiasm, discontentment, frustration, trust, confusion, gratitude, or neutral emotion.

4. The method of claim 1, wherein the plurality of different analysis models includes a contextual summarization model fine-tuned using CRM data to produce a terse summary of the first pulse incorporating customer intention.

5. The method of claim 1, wherein the deep customer insight driven analysis is performed using a setback accountability analysis engine that identifies plausible reasons for customer setbacks and influential factors for the customer setbacks.

6. The method of claim 5, comprising performing, by the setback accountability analysis engine, Aspect-Based Sentiment Analysis (ABSA) to identify customer sentiments associated with specific aspects of products or services.

7. The method of claim 1, wherein the deep customer insight driven analysis is performed using a potential contender analysis engine to provide analysis for a significant factor determination engine to determine, for a keyword associated with the first pulse, a number of contenders represented in a CRM contender list that are influenced by the keyword.

8. The method of claim 1, wherein the deep customer insight driven analysis is performed using a potential contender analysis engine to provide analysis for a significant contender determination engine to determine a contender represented in a CRM contender list is a challenging contender due to multiple customers, including a first customer and a second customer, with positive sentiment, wherein the first pulse is associated with the first customer and the second pulse is associated with the second customer, and to identify keywords of the challenging contender from positive sentiment of the multiple customers.

9. The method of claim 1, further comprising:
utilizing the respective results of the plurality of different analysis models to perform deep customer insight driven analysis, wherein the deep customer insight driven analysis includes a potential contender analysis to identify potential switching customers;
identifying Churned out Customers (CoC) due to contender attraction;
filtering CoC conversation in which contenders are mentioned;
determining a limit on conversation with negative sentiment before churn;
identifying keywords that represent factors behind the CoC using the SCWE model; and
identifying customers before churn using multivariate customer fragmentation based on CoC characteristic and concentrating on customers by improving identified factors before reaching the limit on conversation.

10. The method of claim 9, wherein the deep customer insight driven analysis is performed using a potential contender analysis engine to provide, via contextual summarization that considers negative sentiment customer conversations where a contender is mentioned, a reason why a customer has switched to the contender.

11. The method of claim 9, wherein the plurality of different analysis models includes a Semantic Conscious Word Extraction (SCWE) model trained to extract semantic conscious keywords/key-phrases from pulses and prioritize the keywords/key-phrases based on objectives of an organization.

12. The method of claim 11, wherein the SCWE model is used to prioritize keywords/key-phrases using customized sorting, wherein the sorting order is determined with respect to the priority of at least one of sentiment, intent and emotion provided by an organization.

13. The method of claim 1, wherein the constructing a pattern comprises:
determining intent, sentiment and keywords from interactions with filtered customers;
determining profile-related aspects of the filtered customers;
determining activity-related aspects performed by an organization to the filtered customers;
constructing a pattern from the sentiment and keywords, the profile-related aspects, and the activity-related aspects.

14. The method of claim 1, wherein the deep customer insight driven analysis is performed using a multivariate fragmentation engine that clusters the customers based on the results from the different analysis models.

15. A system comprising:
one or more processors; and
memory storing instructions that, when executed by the one or more processors, cause the system to perform:
collecting a dataset, wherein the dataset includes a first pulse from a first channel and a second pulse from a second channel;
performing preprocessing on the dataset, wherein word embedding is done for the preprocessed data to convert it into vectors;
generating respective results for a plurality of different analysis models, wherein the plurality of different analysis models includes:
pre-training a sentiment analysis model, fine-tuned using Customer Relationship Management (CRM) data to predict sentiment, that classifies the first pulse and the second pulse into respective ones of positive, negative, or neutral sentiment, wherein the sentiment analysis model comprises a deep transfer learning model, and wherein the fine-tuning includes tokenizing the CRM data into a readable format accepted by the pre-trained sentiment analysis model;
an intent analysis model, fine-tuned using CRM data to predict intent, that classifies the first pulse and the second pulse into respective ones of complaint, feedback, query, request, or purchase-related intention;
a Semantic Conscious Word Extraction (SCWE) model trained to extract semantic conscious keywords/key-phrases from pulses, wherein, in operation, the pulses include the first pulse and the second pulse;
utilizing the respective results of the plurality of different analysis models to perform deep customer insight driven analysis, wherein the deep customer insight driven analysis includes:
propulsive business planning to achieve an agenda;
filtering, based on the agenda, customers who have met the agenda;

considering the conversations made by a particular type of entity to the filtered customers, wherein the customer conversations include a first conversation and a second conversation, and wherein the first pulse is associated with the first conversation, and the second pulse is associated with the second conversation;

determining aspects/information about the filtered customers including activity-related aspects, wherein the activity-related aspects identify a number of times that keywords or key-phrases with the intent are mentioned in the conversations with the filtered customers;

increasing or decreasing, based on feedback provided by the customers, any of the sentiment, the keywords, or the key-phrases with the intent;

constructing a pattern from the determined aspects/information to achieve the agenda.

16. A system comprising:

a means for collecting a dataset, wherein the dataset includes a first pulse from a first channel and a second pulse from a second channel;

a means for performing preprocessing on the dataset, wherein word embedding is done for the preprocessed data to convert it into vectors;

a means for generating respective results for a plurality of different analysis models, wherein the plurality of different analysis models includes:

pre-training a sentiment analysis model, fine-tuned using Customer Relationship Management (CRM) data to predict sentiment, that classifies the first pulse and the second pulse into respective ones of positive, negative, or neutral sentiment, wherein the sentiment analysis model comprises a deep transfer learning model, and wherein the fine-tuning includes tokenizing the CRM data into a readable format accepted by the pre-trained sentiment analysis model;

an intent analysis model, fine-tuned using CRM data to predict intent, that classifies the first pulse and the second pulse into respective ones of complaint, feedback, query, request, or purchase-related intention;

a Semantic Conscious Word Extraction (SCWE) model trained to extract semantic conscious keywords/key-phrases from pulses, wherein, in operation, the pulses include the first pulse and the second pulse;

a means for utilizing the respective results of the plurality of different analysis models to perform deep customer insight driven analysis, wherein the deep customer insight driven analysis includes:

propulsive business planning to achieve an agenda;

filtering, based on the agenda, customers who have met the agenda;

considering the conversations made by a particular type of entity to the filtered customers, wherein the customer conversations include a first conversation and a second conversation, and wherein the first pulse is associated with the first conversation, and the second pulse is associated with the second conversation;

determining aspects/information about the filtered customers including activity-related aspects, wherein the activity-related aspects identify a number of times that keywords or key-phrases with the intent are mentioned in the conversations with the filtered customers;

increasing or decreasing, based on feedback provided by the customers, any of the sentiment, the keywords, or the key-phrases with the intent;

constructing a pattern from the determined aspects/information to achieve the agenda.

* * * * *